United States Patent Office  3,525,768  Patented Aug. 25, 1970

3,525,768
N-HYDROXYALKYL OXYPROPIONAMIDES
Donald I. Hoke, Chagrin Falls, Ohio, assignor to The Lubrizol Corporation, Wickliffe, Ohio, a corporation of Ohio
No Drawing. Filed July 17, 1968, Ser. No. 747,774
Int. Cl. C07c *103/38*
U.S. Cl. 260—561                                                4 Claims

ABSTRACT OF THE DISCLOSURE

N-3-oxohydrocarbon-substituted acrylamides are reacted with an alcohol or analogous hydroxy compound in an alkaline medium and then reduced to form compounds which are useful as surfactants and also as chemical intermediates in the preparation of N-3-hydroxyalkyl acrylamides. The latter are useful monomers.

---

This invention relates to new compositions of matter, and more particularly to novel compounds having the formula $$R^1-\underset{\underset{H}{|}}{\overset{\underset{OH}{|}}{C}}H-\underset{\underset{R^3}{|}}{\overset{\underset{R^2}{|}}{C}}-\underset{\underset{R^5}{|}}{\overset{\underset{R^4}{|}}{C}}-\underset{\underset{H}{|}}{N}-\overset{\overset{O}{\|}}{C}-CHCH_2OR$$
$$\phantom{xxxxxxxxxxxxxxxxxxxxxxxxxxxxxxxxxxxxxxxx}R^6$$

wherein R is an alkyl, cycloalkyl, aryl, aralkyl, alkaryl or heterocyclic radical; each of $R^1$, $R^2$, $R^3$, $R^4$ and $R^5$ is individually hydrogen or a hydrocarbon radical; and $R^6$ is hydrogen or a lower alkyl radical.

When used herein, the term "lower alkyl" denotes alkyl radicals having 10 or less carbon atoms, and includes cycloalkyl radicals. The term "hydrocarbon radical" denotes alkyl, cycloalkyl, aryl, alkaryl and aralkyl radicals, and includes substantially hydrocarbon radicals; that is, substituted radicals wherein the substituents are not present in numbers sufficiently high to alter substantially the hydrocarbon character of the radical. Examples of suitable substituents are ether, ester, nitro and halogen groups. Reference to radicals such as alkyl or aryl also includes substantially hydrocarbon derivatives of the same.

In a preferred embodiment of the invention, R, $R^1$, $R^4$ and $R^5$ are lower alkyl radicals; $R^2$ and $R^3$ are hydrogen; and $R^6$ is hydrogen or methyl. The following compounds are illustrative of the invention.

N-(1,1-dimethyl-3-hydroxybutyl)-3-methoxy-propionamide

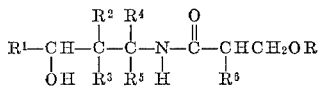

N-(1-methyl-1-ethyl-3-hydroxypenthyl)-3-methoxy-2-methylpropionamide $$C_2H_5-CH-CH_2-\underset{\underset{CH_3}{|}}{\overset{\underset{C_2H_5}{|}}{C}}-N-\overset{\overset{O}{\|}}{C}-CHCH_2OCH_3$$
$$\phantom{xxxxxxxxxxxxxxxxxxxxxxxxxxxxxxxx}CH_3$$

N1(1,3-diphenyl-1-methyl-3-hydroxypropyl)-3-ethoxypropionamide $$C_6H_5CH-CH_2\underset{\underset{CH_3}{|}}{\overset{\underset{C_6H_5}{|}}{C}}-N-\overset{\overset{O}{\|}}{C}-CH_2CH_2OC_2H_5$$

N-(1,3-diphenyl-1-methyl-3-hydroxypropyl)-3-furfuroxypropionamide

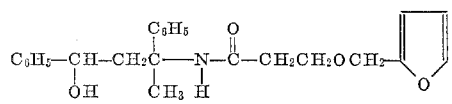

N-(1,1-dimethyl-3-hydroxybutyl)-3-phenoxypropionamide

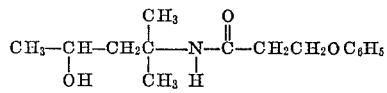

N-(1,1-dimethyl-3-hydroxybutyl)-3-t-butoxypropionamide

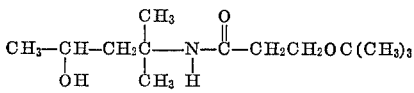

N-(1,1-dimethyl-3-hydroxybutyl)-3-furfuroxypropionamide

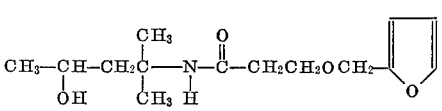

N-(1,1-dimethyl-3-hydroxybutyl)-3-octoxypropionamide

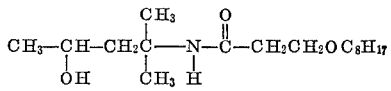

N-(1,1-dimethyl-3-hydroxybutyl)-3-benzoxypropionamide

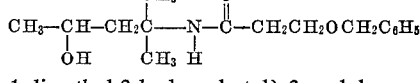

N-(1,1-dimethyl-3-hydroxybutyl)-3-cyclohexoxypropionamide

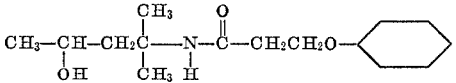

The compounds of this invention may be prepared by reacting a compound of the formula ROH with an N-3-oxohydrocarbon-substituent acrylamide of the formula

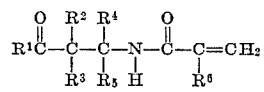

wherein R, $R^1$, $R^2$, $R^3$, $R^4$, $R^5$ and $R^6$ are as defined hereinabove, in the presence of a strongly alkaline catalyst, and subsequently reducing the keto carbonyl group of the intermediate formed thereby. N-3-oxohydrocarbon-substituted acrylamides are disclosed and claimed in U.S. Pat. 3,277,056 and in copending application Ser. No. 582,-501, filed Sept. 28, 1966, now U.S. Pat. No. 3,425,942.

The reaction between the N-3-oxohydrocarbon-substituted acrylamide and ROH (preferably an alcohol) is usually carried out at about 50–100° C., preferably about 50–80° C. The use of an inert solvent, such as an ether or a polyether derived from ethylene glycol or the like, is sometimes advantageous, but it is often preferred to carry out the reaction in an excess of the alcohol being used as a reactant. Product yields are increased when a large excess of the alcohol is used; thus, a mole ratio of alcohol to N-3-oxohydrocarbon-substituted acrylamide between about 8:1 and 12:1 is preferred.

The alkaline catalyst used in the reaction may be an alkali metal such as sodium or potassium; an alkali metal hydroxide such as sodium or potassium hydroxide; an alkoxide such as sodium methoxide, sodium ethoxide, potassium n-butoxide or sodium cyclohexoxide; an alkali metal hydride; or a quaternary ammonium hydroxide such as tetramethylammonium hydroxide. When an alcohol is used as the solvent, it is frequently convenient to react the alkali metal with the alcohol, prior to the addition of the N-3-oxohydrocarbon-substituted acrylamide, to form the corresponding alkoxide. The amount of alkaline catalyst required is generally no more than about 0.1–0.3 mole per mole of N-3-oxohydrocarbon-substituted acrylamide.

The reaction which forms the intermediate (hereinafter sometimes referred to as the "alkoxy intermediate," though the groups thus introduced need not be alkoxy groups) is usually complete within 6–8 hours at about 50–80° C. The alkoxy intermediate may then be isolated by distillation, recrystallization or the like.

A second method for the preparation of the alkoxy intermediate involves the reaction of one mole of a nitrile of the formula

with at least one mole of a β-hydroxy oxohydrocarbon or an α,β-unsaturated oxohydrocarbon, or with at least two moles of an aldehyde or ketone, in the presence of at least one mole of sulfuric acid. This reaction is similar to that used for the preparation of N-3-oxohydrocarbon-substituted acrylamides, and disclosed and claimed in the aforementioned U.S. Pat. 3,277,056. For example, N-(1,1-dimethyl - 3 - oxobutyl)-3-methoxypropionamide can be prepared by reacting one mole of 3-methoxypropionitrile with one mole of mesityl oxide or diacetone alcohol, or with two moles of acetone, in the presence of 1–2 moles of sulfuric acid.

In the second step, the carbonyl group of the alkoxy intermediate is reduced to a carbinol group, ordinarily by hydrogen in the presence of a suitable hydrogenation catalyst but optionally by means of chemical reducing agents such as sodium borohydride, isopropanol and aluminum isopropoxide or the like. Typical hydrogenation catalysts which may be used are palladium, platinum and Raney nickel; Raney nickel is preferred. The compounds of this invention may be separated from the reaction mixture and purified by known techniques.

The preparation of the compounds of this invention is illustrated by the following examples.

EXAMPLE 1

To a solution of 4070 parts (24 moles) of N-(1,1-dimethyl-3-oxobutyl)acrylamide (diacetone acrylamide) in about 6000 parts of methanol is added a solution of sodium methoxide prepared from 54 parts (2.4 moles) of sodium in about 144 parts of methanol. (A total of 192 moles of methanol is used.) The resulting solution is heated under reflux for 6½ hours, and then 120 parts of sulfuric acid is added, followed by a few grams of acetic acid to neutralize the mixture. The methanolic solution is filtered and the methanol is removed by distillation under reduced pressure. There is obtained 4535.8 parts (94% of the theoretical amount) of N-(1,1-dimethyl-3-oxobutyl)-3-methoxypropionamide. The product is a clear liquid.

A solution of 490 parts of N-(1,1-dimethyl-3-oxobutyl)-3-methoxypropionamide in 320 parts of methanol is purged with nitrogen, and 28.2 parts of Raney nickel is added. The mixture is pressurized with hydrogen in an autoclave at 1150 p.s.i. and heated to 49° C., and then to 72° C. over 45 minutes. After heating at 72° C. for an additional 3½ hours, with periodic restoration of the 1150 p.s.i. hydrogen pressure, the Raney nickel is removed by filtration and the methanol is stripped. There is obtained 475 parts of N-(1,1-dimethyl-3-hydroxybutyl)-3-methoxypropionamide.

EXAMPLE 2

The procedure of Example 1 is repeated, except that the diacetone acrylamide is replaced by an equimolar amount of N-(1,3-diphenyl-1-methyl-3-oxopropyl)acrylamide and the methanol by an equimolar amount of furfuryl alcohol. The product is N-(1,3-diphenyl-1-methyl-3-hydroxypropyl)-3-furfuroxypropionamide.

EXAMPLE 3

N-(1,3-diphenyl - 1 - methyl - 3 - hydroxypropyl)-3-ethoxypropionamide is prepared by reacting 2930 parts (10 moles) of N-(1,3-diphenyl-3-oxopropyl)acrylamide with 3680 parts (80 moles) of absolute ethanol, in the presence of sodium ethoxide prepared from 23 parts (1 mole) of sodium, as described in Example 1, and subsequently reducing the intermediate thus formed with sodium borohydride in aqueous solution.

EXAMPLE 4

A solution of 169 parts (1 mole) of diactone acrylamide and 9.1 parts (0.1 mole) of tetramethylammonium hydroxide in 250 parts (8 moles) of methanol is heated under reflux for about 5 hours. The solution is then neutralized with sulfuric acid and a small amount of acetic acid and the methanol is removed by distillation under reduced pressure. The intermediate thus formed is hydrogenated as described in Example 1 to yield N-(1,1-dimethyl-3-hydroxybutyl)acrylamide.

EXAMPLE 5

To a mixture of 85 parts (1.0 mole) of 3-methoxypropionitrile and 116 parts (2.0 moles) of acetone is added dropwise 100 parts (1.0 mole) of sulfuric acid over one-half hour. An exothermic reaction occurs and the temperature of the reaction mixture is maintained at about 53° C. by cooling. Periodic cooling is continued as the exothermic reaction proceeds for one hour after the sulfuric acid addition is complete; the mixture is then heated at 55–60° C. for two hours.

The reaction mixture is neutralized by addition of a solution of 84 parts of sodium hydroxide in 200 parts of water, while the temperature of said mixture is held below 50° C. by external cooling. An organic layer separates and is removed; the aqueous layer is extracted with several portions of chloroform and the chloroform extracts are combined with the organic layer. The solution is dried and the solvent removed by distillation under vacuum. The intermediate thus produced is hydrogenated as in Example 1 to produce N-(1,1-dimethyl-3-hydroxybutyl)-3-methoxypropionamide.

EXAMPLE 6

To a solution of 0.23 part (0.01 mole) of sodium in 31 parts of n-butanol is added 68 parts (0.4 mole) of diacetone acrylamide. The mixture is allowed to stand at room temperature for 24 hours, after which time an additional 13 parts of n-butanol (0.6 mole total) is added and the solution is heated to 50° C. for two hours. The mixture is neutralized with acetic acid and the excess n-butanol is removed by distillation under reduced pressure. The intermediate thus prepared is reduced with isopropanol and aluminum isopropoxide (Meerwein-Ponndorf-Verley reduction) to produce N-(1,1-dimethyl-3-hydroxybutyl)-3-n-butoxypropionamide.

EXAMPLE 7

Sodium, 2.3 parts (0.1 mole), is added to 50 parts of amyl alcohol. The solution is then added to a solution of 169 parts (1 mole) of diacetone acrylamide in 250 parts of n-amyl alcohol (3.4 moles total). The solution is heated for 9 hours at 60–70° C., neutralized with acetic acid and filtered. The excess n-amyl alcohol is removed by evaporation under reduced pressure and the resulting intermediate is hydrogenated as in Example 1 to give the desired product, N-(1,1 - dimethyl - 3-hydroxybutyl)-3-pentoxypropionamide.

EXAMPLE 8

Following the procedure of Example 7, N-(1,1-dimethyl - 3 - hydroxybutyl) - 3 - octoxypropionamide is prepared by the reaction of 1 mole of diacetone acrylamide with 8 moles of isooctyl alcohol in the presence of 0.1 mole of sodium, followed by hydrogenation.

EXAMPLE 9

To a solution of 0.23 part (0.01 mole) of sodium in 22 parts of benzyl alcohol is added 34 parts (0.2 mole) of diacetone acrylamide. The mixture is maintained at a temperature of 50° C. for 66 hours, after which time an additional 10 parts (0.3 mole total) of benzyl alcohol is added and the mixture is maintained at 50° C. for an additional 24 hours. It is then neutralized with acetic acid and the benzyl alcohol and unreacted diacetone acrylamide are removed by distillation under reduced pressure. The intermediate thus prepared is hydrogenated as in Example 1 to produce N-(1,1-dimethyl-3-hydroxybutyl)-3-benzoxypropionamide.

EXAMPLE 10

Following the procedure of Example 9, N-(1,1-dimethyl - 3 - hydroxybutyl)-3-cyclohexoxypropionamide is prepared by hydrogenating the reaction product of 34 parts (0.2 mole) of diacetone acrylamide, 30 parts (0.3 mole) of cyclohexanol and 0.11 part (0.005 mole) of of sodium.

The compounds of this invention are surface active and may be used as surfactants, detergents, wetting agents, penetrants, emulsifying agents, solubilizers and textile dyeing assistants. The surface active effect of the compounds of this invention is illustrated by the following table which shows the decrease in surface tension obtained by the addition of N-(1,1-dimethyl-3-hydroxybutyl)-3-methoxypropionamide to water in the indicated amounts.

| Concentration, percent by weight: | Surface tension, dynes/cm. |
|---|---|
| 0 | 72 |
| 0.1 | 68.8 |
| 1.0 | 60.3 |
| 10.0 | 50.96 |

The compounds of this invention are also useful as chemical intermediates, particularly for the preparation of interesting and useful derivatives of N-3-oxohydrocarbon-substituted acrylamides. Because of the presence in their molecular structure of an olefinic double bond, N-3-oxohydrocarbon-substituted acrylamides such as diacetone acrylamide undergo many side reactions when attempts are made to convert them into other compounds. For example, when the 3-oxo group is reduced to a hydroxy group, the olefinic double bond is usually also reduced to an ethyl group. By conversion of the N-3-oxohydrocarbon-substituted acrylamides to the compounds of this invention, the olefinic double bond may be blocked from further reaction; it can subsequently be regenerated, typically by pyrolysis of the product in contact with strong alkali.

An example of a compound which can be obtained from diacetone acrylamide by using the compounds of the present invention as intermediates is N-(1,1-dimethyl-3-hydroxybutyl)-acrylamide, which may be prepared by converting diacetone acrylamide to N-(1,1-dimethyl-3-hydroxybutyl)-3-methoxypropionamide or a similar compound of the present invention and pyrolyzing the latter over solid sodium hydroxide.

N-(1,1-dimethyl-3-hydroxybutyl)acrylamide is a useful monomer, and may be converted into homopolymers and copolymers with a number of interesting uses. For example, it may be homopolymerized in the presence of a free radical catalyst and the homopolymer formed into membranes which are useful for desalination of water by hyperfiltration.

The following examples illustrate reactions of the compounds of this invention to form useful products.

EXAMPLE 11

N - (1,1 - dimethyl - 3 - hydroxybutyl) - 3 - methoxypropionamide, 475 grams, is allowed to drip onto sodium hydroxide pellets heated at 160–170° C. in a glass tube which has been evacuated to a pressure of 30 mm. The system is maintained under nitrogen during the reaction. There is obtained a 98% yield of N-(1,1-dimethyl-3-hydroxybutyl)acrylamide.

EXAMPLE 12

A solution of 100 grams of N-(1,1-dimethyl-3-hydroxybutyl)acrylamide in 400 grams of benzene is heated under reflux, and 10 ml. of a solution of 2 parts of azobisisobutyronitrile in 40 ml. of benzene is added. The mixture is stirred and cooled to room temperature, whereupon an orange gel forms. It is removed by filtration, pulverized in heptane and dried under vacuum. The polymer is then purified by dissolving in methanol and reprecipitating with water.

A solution of 20 parts of the above polymer in 30 parts of formamide and 80 parts of acetone is cast on glass and the solvent is evaporated to form a 1-mil film. After drying, the film is removed by soaking in water at room temperature for one hour and at 40° C. for 15 minutes. When used as a hyperfiltration membrane for desalinating a 0.5 sodium chloride solution at 600 p.s.i.g., this membrane gives a salt rejection of 82.5% at a water flux of 300 gallons per square foot per day.

What is claimed is:

1. A compound having the formula

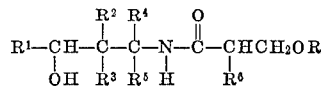

wherein R is a lower alkyl, cycloalkyl of less than 10 carbon atoms, phenyl, phenyl-substituted lower alkyl, or furfuryl radical; each of $R^1$, $R^2$, $R^3$, $R^4$ and $R^5$ is individually hydrogen or a lower alkyl or phenyl radical; and $R^6$ is hydrogen or a lower alkyl radical.

2. A compound according to claim 1 wherein R, $R^1$, $R^4$ and $R^5$ are lower alkyl radicals; $R^2$ and $R^3$ are hydrogen; and $R^6$ is hydrogen or methyl.

3. A compound according to claim 2 having the formula

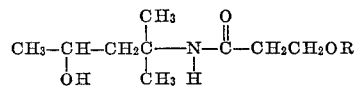

wherein R is a lower alkyl radical.

4. N - (1,1 - dimethyl - 3 - hydroxybutyl)-3-methoxypropionamide, the compound of claim 3 wherein R is methyl.

References Cited

UNITED STATES PATENTS 3,277,056   10/1966   Coleman _____ 260—561 XR

ALEX MAZEL, Primary Examiner

J. A. NARCAVAGE, Assistant Examiner

U.S. Cl. X.R.

210—321; 252—152; 260—89.7, 347.3, 559, 562